United States Patent [19]

Phelps et al.

[11] Patent Number: 5,108,967
[45] Date of Patent: * Apr. 28, 1992

[54] PROCESS FOR PRODUCING NONEQUIAXED SILICON ALUMINUM OXYNITRIDE

[75] Inventors: Frankie E. Phelps; Gerald W. Leech, both of Apollo; Robert W. Woods, New Kensington, all of Pa.

[73] Assignee: Aluminum Company of America, Pittsburgh, Pa.

[*] Notice: The portion of the term of this patent subsequent to Dec. 11, 2007 has been disclaimed.

[21] Appl. No.: 625,205

[22] Filed: Dec. 10, 1990

Related U.S. Application Data

[63] Continuation-in-part of Ser. No. 351,660, May 15, 1989, Pat. No. 4,977,113.

[51] Int. Cl.[5] .................... C01B 33/26; C04B 35/58
[52] U.S. Cl. .......................... 501/98; 423/327
[58] Field of Search .................... 423/327; 501/98

[56] References Cited

U.S. PATENT DOCUMENTS

| | | | |
|---|---|---|---|
| 3,837,871 | 9/1974 | Weaver | 106/65 |
| 3,903,230 | 9/1975 | Kamigaito et al. | 264/122 |
| 3,960,581 | 6/1976 | Cutler | 106/65 |
| 3,991,166 | 11/1976 | Jack et al. | 423/327 |
| 4,147,759 | 4/1979 | Demit | 423/327 |
| 4,172,108 | 10/1979 | Maeda | 264/65 |
| 4,499,193 | 2/1985 | Phelps et al. | 501/98 |
| 4,511,666 | 4/1985 | Phelps et al. | 501/98 |
| 4,680,278 | 7/1987 | Inoue et al. | 501/98 |
| 4,731,236 | 3/1988 | Murakawa et al. | 501/98 |
| 4,812,298 | 3/1989 | Kohtoku et al. | 423/327 |
| 4,977,113 | 12/1990 | Phelps et al. | 501/98 |

FOREIGN PATENT DOCUMENTS 260410 12/1985 Japan ..................... 423/327

OTHER PUBLICATIONS

"Review-Sialons and Related Nitrogen Ceramics", Journal of Materials Science, 11 (1976) 1135-1158.

Primary Examiner—Wayne Langel
Attorney, Agent, or Firm—David W. Pearce-Smith

[57] ABSTRACT

A $\beta'$SiAlON produced from initial reactant materials comprising $Al_2O_3$, and carbon that produces a $\beta'$SiAlON material having a strength greater than about 50 ksi at approximately 1000° C. In a preferred embodiment of the invention the $\beta'$SiAlON material has a strength greater than about 50 ksi at approximately 1200° C. In a second embodiment of the present invention is a low-cost process for producing unsintered high purity alpha silicon nitride structured SiAlON by carbothermic reaction from initial reactant materials comprising $Al_2O_3$, $SiO_2$ and carbon.

14 Claims, 2 Drawing Sheets

PROCESS FOR PRODUCING NONEQUIAXED SILICON ALUMINUM OXYNITRIDE

CROSS REFERENCE TO RELATED APPLICATIONS

This application is a continuation-in-part of co-pending U.S. Ser. No. 351,660, filed May 15, 1989, U.S. Pat. No. 4,977,113.

TECHNICAL FIELD

This invention relates to a process for making nonequiaxed silicon aluminum oxynitride material and, more particularly, relates to a process for producing an unsintered silicon aluminum oxynitride by carbothermic reaction without the need to use contaminating impurities to increase the rate of reaction.

BACKGROUND ART

Silicon aluminum oxynitride refractory/ceramic materials, and more particularly materials in the $Si_3N_4$—$AlN$—$Al_2O_3$—$SiO_2$ system, are of ever-increasing interest for refractory/ceramic applications. For ease of identification, compositions within this system are referred to as SiAlON, and a number of different phases of SiAlON have been produced and identified. For example, Jack et al U.S. Pat. No. 3,991,166 describes one phase and methods of making it, the phase having the general formula $Si_{6-z}Al_zO_zN_{8-z}$ where z is greater than zero and less than or equal to five. Various compositions within the bounds of the general formula taught by Jack et al may be produced, and each has a crystalline structure similar to beta-$Si_3N_4$ and is consequently identified as beta'-SiAlON ($\beta'$-SiAlON). $\beta'$-SiAlON can be defined as a solid solution of $Al_2O_3$ within a matrix of $Si_3N_4$. The compositional limits of reactants, referred to as effective reactants, to produce $\beta'$-SiAlON may be seen by referring to FIG. 2. The compositional amounts of $Si_3N_4$, AlN and $Al_2O_3$ for any $\beta'$-SiAlON formulation may be determined by referring to line AB which is a plot of the compositions of the aforesaid compounds to produce a $\beta'$-SiAlON having the general formula $Si_{6-z}Al_zO_zN_{8-z}$ where z is greater than zero and less than or equal to five.

Another phase, known as y-phase SiAlON represented by the formula $SiAl_4O_2N_4$, is described in an article entitled "Review: SiAlONs and Related Nitrogen Ceramics", published in *Journal of Material Sciences*, 11 (1976) at pages 1135-1158. Compositions of SiAlON within a given phase and from phase to phase demonstrate varying characteristics, for example, variances in density, which effect their preferential use in a given application.

A number of processes for making silicon aluminum oxynitride refractories and technical ceramics have been suggested. Weaver U.S. Pat. No. 3,837,871 describes a method for producing a product having a substantial amount of what the patentee believes to be the quaternary compound silicon aluminum oxynitride which has a structure similar to that of beta $Si_3N_4$ but with an expanded lattice structure. Weaver's method of making the described product is hot pressing $Si_2ON_2$ (silicon oxynitride) in the presence of varying amounts of aluminum.

Kamigaito et al U.S. Pat. No 3,903,230 describes a method of making a silicon aluminum oxynitride ceramic by sintering or hot pressing a mixture of finely divided powders of silicon nitride, alumina and aluminum nitride.

Cutler U.S. Pat. No. 3,960,581 describes a process for producing SiAlON by reacting silicon and aluminum compounds in the presence of carbon and nitrogen. Cutler teaches and stresses the importance of using a reactant material having the silicon and aluminum compounds intimately combined prior to nitriding in order that aluminum oxide is intimately dispersed throughout silicon nitride in the final product. Suggested reactant materials are clay, rice hulls having a solution containing a dissolved aluminum salt absorbed therein, and a precipitate of aluminum and silicon salts. In each case Cutler emphasizes that the silicon and aluminum compound reactants are intimately combined prior to nitriding to produce SiAlON. Further, in the process as taught by Cutler, excess carbon and unreacted silicon dioxide must be removed from the mixture after the mixture is nitrided.

Maeda U.S. Pat. No. 4,172,108 describes a process for production of SiALONs which involves heating a mixture containing a silicon nitride precursor having at least one silicon-nitrogen bond and an alumina precursor having at least one aluminum-oxygen bond to at least 1000° C.

Inoue U.S. Pat. No. 4,680,278 describes a process for preparing aluminum nitride powder having small particle size and small particle size distribution and also having a uniform shape of particles, at a lower temperature and in a shorter period of time. Inoue teaches that the aluminum nitride powder can be mixed in predetermined amounts with silicon carbide and silicon nitride to form SiAlON.

Thus far, of all the SiAlON materials, the $\beta'$-SiAlONs have generated the greatest interest because their refractory properties and corrosion resistance characteristics are comparable to other nitride refractories such as silicon nitride and silicon oxynitride. More recently, the $\beta'$-SiAlONs have generated a great deal of interest as technical ceramics, i.e. monolithic engineered ceramics.

$\beta'$-SiAlON compositions offer a distinct advantage over silicon nitride and silicon oxynitride for making a refractory because some of the compositions of $\beta'$-SiAlON material can be used to produce a high density refractory by conventional sintering techniques. To produce high density ceramics from silicon nitride or silicon oxynitride requires the use of pressure sintering techniques.

Jack et al U.S. Pat. No. 3,991,166 describes a $\beta'$-SiAlON product produced by sintering a mixture of alumina or a compound which decomposes to produce alumina and silicon nitride. Another method of producing $\beta'$-SiAlON as described by Jack et al is nitriding silicon powder in the presence of alumina powder.

Demit U.S. Pat. No. 4,147,759 describes a method of manufacturing $\beta'$-SiALON compounds. The method involves reacting silicon nitride and aluminum oxynitride in the presence of an agent which generates gaseous silicon monoxide.

It may be noted that several of the foregoing processes employ silicon nitride or silicon oxynitride as reactants. Neither of these compounds is found in nature and they are relatively expensive to produce. The production of SiAlON from discrete particles of an $SiO_2$ source and discrete particles of an $Al_2O_3$ source requires a catalyst to enhance both reaction rates and stoichiometry so as to make the process inexpensive and economically attractive.

Phelps et al U.S. Pat. No. 4,499,193 describes a process for carbothermically producing an unsintered refractory material comprising essentially $\beta'$-SiAlON wherein the initial reactants include discrete particles of an $SiO_2$ source and discrete particles of an $Al_2O_3$ source. Phelps discloses that it is advantageous to add iron in the form such as $Fe_2O_3$ as a catalyst in promoting the formation of $\beta'$-SiAlON. The $\beta'$-SiAlON material produced according to the teachings of this patent have the microstructure of $\beta'$-$Si_3N_4$ and sinter into a material that has an equiaxed microstructure.

Phelps et al U.S. Pat. No. 4,511,666 describes a process for carbothermically producing an unsintered refractory material comprising essentially $\beta'$-SiAlON wherein initial reactants include discrete particles of an $SiO_2$ source, discrete particles of an $Al_2O_3$ source and discrete particles of silico alumina compounds. The initial reactants are nitrided for sufficient times and temperatures to convert at least a portion of the initial reactants to at least a portion of effective reactants, and the effective reactants are then further heated to produce an essentially $\beta'$-SiAlON refractory material. Phelps discloses that it is advantageous to add iron in the form such as $Fe_2O_3$ as a catalyst in increasing the rate of reaction and promoting the formation of $\beta'$-SiAlON. Phelps also discloses that oxides of other transitional metals such as nickel, chrome or manganese, for example, may also be used as catalysts. The $\beta'$-SiAlON material produced according to the teachings of this patent have the microstructure of $\beta$-$Si_3N_4$ and sinter into a material that has an equiaxed microstructure.

Generally, only a small percentage of catalyst, such as 2% or less $Fe_2O_3$, for example, is added to increase the rate of carbothermic reaction and reduce the length of time needed to form SiAlON. However, when $Fe_2O_3$ is used as a catalyst, the iron reacts with silica to produce an FeSi phase which is present as a contaminant in the final sintered product. FeSi forms flaw sites in the SiAlON which initiate fractures and lowers its room temperature strength. Furthermore, when the SiAlON is used in high temperature (1200°–1300° C.) applications, the FeSi oxidizes and further reduces the materials strength.

The use of $\beta'$-SiAlONs as refractory/ceramic materials is the result of their ability to maintain superior strength, hardness, creep resistance and resistance to chemical attack at elevated temperatures (above 1000° C.). Co-pending U.S. Ser. No. 351,660 discloses a process for producing an unsintered SiAlON material by carbothermic reaction without the use of contaminating transition metal oxides to increase the rate of reaction. The process includes providing small quantities of SiAlON crystals which seed the reaction. The absence of FeSi in the $\alpha'$SiAlON produced a material with an increased the high temperature strength.

Increasing demands in the refractory/ceramic industry as creating a need for materials with increased strength at high temperatures. It would be advantageous, therefore, to provide a process whereby readily available and relatively inexpensive initial reactant materials comprising $Al_2O_3$ and $SiO_2$ are nitrided to make silicon aluminum oxynitride materials having a strength greater than 50 ksi at 1000° C.

Another object of the present invention is to provide a low-cost process for producing SiAlON from initial reactant materials comprising $Al_2O_3$, $SiO_2$ and carbon that does not require the addition of transition metals such as iron, nickel, chrome or manganese, to be used as catalysts to increase the rate of reaction.

A further object of the present invention is to provide a process for producing unsintered $\beta'$-SiALON powder by carbothermic reaction.

These and other objects and advantages will be more fully understood and appreciated with reference to the following description.

SUMMARY OF THE INVENTION

A $\beta'$SiAlON produced from initial reactant materials comprising $Al_2O_3$, $SiO_2$ and carbon that produces a $\beta'$SiAlON material having a strength greater than about 50 ksi at approximately 1000° C. In a preferred embodiment of the invention the $\beta'$SiAlON material has a strength greater than about 50 ksi at approximately 1200° C.

A second embodiment of the present invention is a low-cost process for producing unsintered high purity alpha silicon nitride structured $\beta'$SiAlON by carbothermic reaction from initial reactant materials comprising $Al_2O_3$, $SiO_2$ and carbon.

A third embodiment of the present invention is a nonequiaxed $\beta'$SiAlON material. The nonequiaxed $\beta'$SiAlON is produced by a process which comprises the steps of (1) providing a mixture of initial reactant materials as sources of $SiO_2$, $Al_2O_3$ and C in a reactor; (2) adding into said mixture crystals selected from the group of $\alpha$-$Si_3N_4$ and unsintered $\beta'$-SiALON having the crystal structure of $\alpha$-$Si_3N_4$; (3) nitriding said mixture at temperatures between 1200° C. and 1450° C. for a time sufficient to convert at least a portion of said initial reactants to at least a portion of effective reactants; and (4) heating said effective reactants in the presence of nitrogen at temperatures from 1400° to 1530° C. for a time sufficient to convert said effective reactants to an essentially $\beta'$-SiAlON refractory material having the crystal structure of $\alpha$-$Si_3N_4$. This $\beta'$-SiAlON can then be sintered form $\beta'$-SiAlON having the crystal structure of $\beta$-$Si_3N_4$. This sintered $\beta'$-SiAlON has a microstructure that has acicular (needlelike crystals) throughout in addition to the equiaxed crystals.

DESCRIPTION OF A PREFERRED EMBODIMENT

As has been noted previously, $\beta'$-SiAlON may be defined as a solid solution of $Al_2O_3$ within an $Si_3N_4$ matrix and is represented by the general formula $Si_{6-z}Al_zO_zN_{8-z}$ where z is greater than zero and less than or equal to five. Heretofore, $\beta'$SiAlONs are equiaxed and have a microstructure that is equiaxed and have a crystal structure of expanded $\beta'Si_3N_4$.

The carbothermic formation of $\beta'$-SiAlON by the process of the present invention can be represented by the following equation:

$$Al_2O_3 + SiO_2 + C \xrightarrow{N_2(g) + X} \beta'\text{-SiALON} + CO \qquad (a)$$

where X is selected from the group of $\alpha$-Si$_3$N$_4$ and unsintered $\beta'$-SiALON having the microstructure of $\alpha$-Si$_3$N$_4$.

$\alpha$-Si$_3$N$_4$ differs from $\alpha$-Si$_3$N$_4$ in that the crystal lattice of the $\alpha$-Si$_3$N$_4$ in the c direction is approximately twice the length of the crystal lattice of $\beta$-Si$_3$N$_4$.

Figure 1:
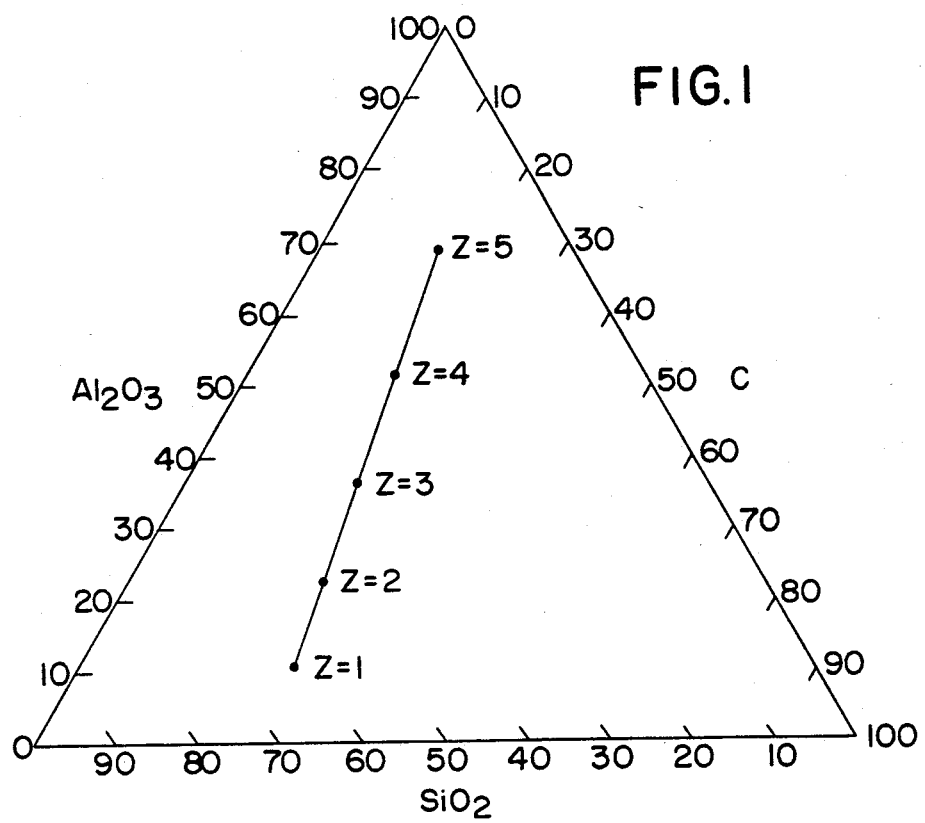
FIG. 1 is a graph showing the compositional limits of transitional or effective reactants to produce $\beta'$-SiAlON by a process of this invention.
Figure 2:
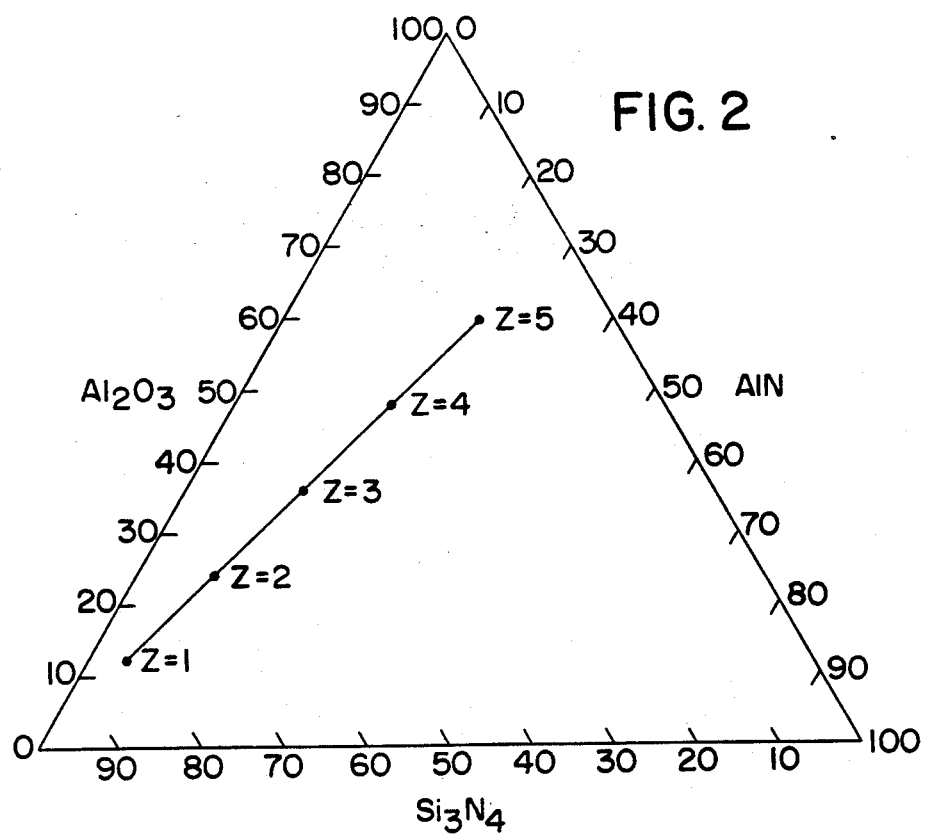
FIG. 2 is a graph showing the compositional limits of the initial reactants to produce $\beta'$-SiAlON by a process of this invention.

To produce $\beta'$-SiAlON by a process of this invention, initial reactants Al$_2$O$_3$, SiO$_2$ and C are provided in compositional ratios as indicated by the line AB in FIG. 1. To produce a $\beta'$-SiAlON when z=2 with a formula of Si$_2$AlON$_3$, for example, would require 23% by weight Al$_2$O$_3$, 24% by weight C and 53% by weight SiO$_2$.

The SiO$_2$, Al$_2$O$_3$ and C initial reactants, together with one micron crystals selected from the group of $\alpha$-Si$_3$N$_4$ and unsintered $\beta'$-SiALON having the microstructure of $\alpha$-Si$_3$N$_4$, are mechanically mixed by any suitable mixing method to uniformly blend the particles, if necessary. The particles are then combined with enough liquid vehicle, such as water, by mixing either during blending or subsequent thereto, preferably subsequent thereto, to render the mixture plastic for extruding or other molding methods familiar to one skilled in the art to produce a pellet suitable for nitriding. The particle size of the reactants may vary, but generally, the smaller the particle size, the more complete the reaction when fired, as will be discussed later. The preferred median particle size of Al$_2$O$_3$ is less than 3.5 microns and more preferably less than 1 micron. The preferred SiO$_2$ source is fumed silica having a median particle size of 0.1 micron, however the silica source may have a particle size which is as large as about 25 microns.

After mixing and molding the initial reactants into pellets, the pellets are dried at a low temperature, such as 110° C., for example, to drive off any excess moisture. The pellets are then charged into a reaction chamber adapted to nitride and heat the pellets in a two-stage heating cycle. Nitrogen may be provided as a gas or a compound, such as ammonia, for example, that will reduce to nitrogen gas at the reaction temperature. It is preferred that the nitrogen be provided continuously under a positive pressure to insure that the nitrogen will uniformly contact all of the reactants during the reaction cycle. A suitable reactor to accomplish the above purposes is a fluid bed reactor or packed bed reactor provided with a nitrogen gas dispersing means near the bottom of the reactor and a nitrogen and off-gas outlet near the top. After charging a first charge of pellets into the reactor into an upper heat zone to form a suitable bed, nitrogen is dispersed through the bed under a positive pressure to purge the reactor of its normal atmosphere.

After establishing a nitrogen atmosphere within the reactor, temperature of the reactants is elevated by a suitable heating means to a temperature of at least 1200° C., preferably at least 1400° C., in the upper heating zone of the reactor. It is believed that by maintaining the reactants at a given temperature of at least 1200° C. for a sufficient period of time, a portion of the initial reactants are reduced to a portion of the effective reactants necessary for producing an unsintered $\beta'$-SiAlON having microstructure of $\alpha$-Si$_3$N$_4$. The material has a composition that falls within the $\beta'$SiAlON phase. However, x-ray diffraction patterns of the material is similar to $\alpha$-Si$_3$N$_4$.

The period of time required to accomplish this initial reaction will vary with the temperature employed. It has been discovered that although no catalyst has been added to the initial mixture heating the mixture at a temperature of 1200°–1400° C. for 1-3 hours, for example, is sufficient to accomplish the initial reaction in the process when it is seeded with $\beta'$-SiALON having the microstructure of $\alpha$-Si$_3$N$_4$. It has also been discovered that when the reactant temperatures exceed 1450° C., the nitridation of silica will cease and silicon carbide will form as the preferred species. In addition, Al$_2$O$_3$ and carbon have been found to react at an appreciable rate when the reactant temperatures exceed 1450° C. to 1480° C. Therefore, if the nitrification is not completed before beginning the second higher temperature heating, silicon carbide will be present in the product.

It is believed that the above-described initial nitriding step yields Si$_3$N$_4$, traces of AlN which are not normally detectable by x-ray diffraction procedures and CO as off-gas. The reactions may be represented by the equations:

$$SiO_2 + C \xrightarrow{N_2(g) + X} \alpha\text{-Si}_3N_4 + CO \qquad (b)$$

$$Al_2O_3 + C \xrightarrow{N_2(g) + X} AlN + CO \qquad (c)$$

where X is selected from the group of $\alpha$-Si$_3$N$_4$ and unsintered $\beta'$-SiALON having the microstructure of $\alpha$-Si$_3$N$_4$.

It may be noted that in addition to Si$_3$N$_4$ and AlN, Al$_2$O$_3$ is also required as an effective reactant in producing $\beta'$-SiAlON having the microstructure of $\alpha$-Si$_3$N$_4$. Al$_2$O$_3$ is provided in a quantity in excess of the amount needed for production of the necessary AlN so that a portion of the Al$_2$O$_3$ remains as an effective reactant after the initial reaction. It is also to be noted that some conversion of the effective reactants begins to occur during the first heating step at temperatures as low as 1200° C.

Following the above-described initial nitriding step, the first charge of pellets is moved to a second heat zone and the reactant temperature is increased to a maximum of 1650° C., preferably within a range of 1450° to 1530° C., and maintained within that temperature range for a time sufficient to convert the effective reactants to an unsintered $\beta'$-SiAlON powder having the microstructure of $\alpha$-Si$_3$N$_4$. Concurrently with the movement of the first charge of pellets into the second heat zone, additional initial reactants are charged into the first heat zone. As previously stated, it is believed that some conversion of the effective reactants begins to occur at temperatures as low as 1200° C., but it has been discovered that if the temperature is increased, less time is required to effect an essentially complete conversion of the effective reactants to unsintered $\beta'$-SiAlON powder having the microstructure of $\alpha$-Si$_3$N$_4$. Within a range of 1450° to 1530° C., a heating time of 2 hours is sufficient to yield an essentially single phase $\beta'$-SiAlON material having the microstructure of $\alpha$-Si$_3$N$_4$. Thus, the time of residence of the reactants in each heat zone can be controlled to be essentially the same and the process can be operated on a continuous or batch-by-batch basis.

In an alternate method of operating the process continuously, the initial reactants may be fed into the first heat zone at a rate suitable to traverse the first heat zone and effect the conversion to effective reactants. The effective reactants then move continuously into the second heat zone and traverse the second zone in a sufficient length of time to allow the reactants to convert to an essentially $\beta'$-SiAlON material having the microstructure of $\alpha$-Si$_3$N$_4$.

It may be seen that the extent of the heat zones may be adjusted to insure that the pellets remain in each heat zone a sufficient length of time as they advance at a uniform rate. Although raising the temperature in the final nitriding step is advantageous in effecting a conversion of the transitional or effective reactants into an essentially single phase $\beta'$-SiAlON having the microstructure of $\alpha$-Si$_3$N$_4$, raising the temperature above approximately 1650° C. promotes the formation of other SiAlON phases which may be detrimental to the purposes of the end product formed by the method of the invention.

During the final heating step after nitriding, a nitrogen atmosphere is maintained in the reactor to preserve a stoichiometric balance as expressed in the equation:

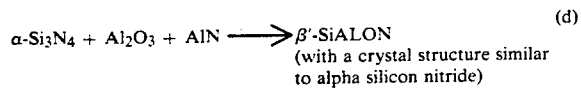
(d)
$\alpha$-Si$_3$N$_4$ + Al$_2$O$_3$ + AlN ⟶ $\beta'$-SiAlON
(with a crystal structure similar to alpha silicon nitride)

Once again, it is to be noted that some conversion of the effective reactants begins to occur during the first heating step at temperatures as low as 1200° C., but if the temperature is increased, less time is required to effect an essentially complete conversion of the effective reactants to $\beta'$-SiAlON having the crystal structure of $\alpha$-Si$_3$N$_4$. One skilled in the art will appreciate that equations (a), (b) and (c) above are taking place simultaneously (although not at the same rates) and are theoretical tools for understanding the carbothermic reaction of equation (a).

In the foregoing description, the two-step nitriding and heating cycle of the reactants is accomplished successively. The reactions may be represented by the equations:

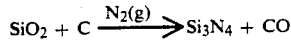
(e)
SiO$_2$ + C $\xrightarrow{N_2(g)}$ Si$_3$N$_4$ + CO

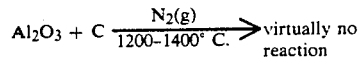
(f)
Al$_2$O$_3$ + C $\xrightarrow[1200-1400° C.]{N_2(g)}$ virtually no reaction

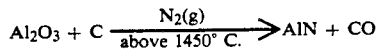
(g)
Al$_2$O$_3$ + C $\xrightarrow[\text{above } 1450° C.]{N_2(g)}$ AlN + CO Surprisingly, it has been found that if $\alpha$-Si$_3$N$_4$ crystals are used in place of the $\beta'$-SiAlON crystals, the structure of the resulting $\beta'$SiAlON is similiar to $\alpha$-Si$_3$N$_4$.

$\beta'$-SiAlON refractory material having the crystal structure of $\alpha$-Si$_3$N$_4$ can then be sintered form $\beta'$-SiAlON having the crystal structure of $\beta$-Si$_3$N$_4$. Prior to sintering the $\beta'$-SiAlON refractory material having the crystal structure of $\alpha$-Si$_3$N$_4$ is ground to a powder and then compacted. The sintering of the $\beta'$-SiAlON refractory material may be expressed in the equation:

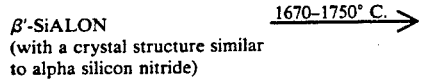
(h)
$\beta'$-SiAlON $\xrightarrow{1670-1750° C.}$
(with a crystal structure similar to alpha silicon nitride)

$\beta'$-SiALON
(with 1. a crystal structure similar to beta silicon nitride and
2. a microstructure that has acicular crystals throughout)

As noted above, the sintered $\beta'$-SiAlON has a microstructure that is similar to $\alpha$-Si$_3$N$_4$ and has acicular (needlelike) crystals throughout in addition to the equiaxed crystals.

The formation of acicular $\beta'$-SiAlON is surprising. Acicular $\beta'$-SiAlON is a new form of $\beta'$-SiAlON. Heretofore, $\beta'$-SiAlON produced by carbothermic reaction has crystal structure of $\beta$-Si$_3$N$_4$ and sintered into an equiaxed material.

For convenience, the term alpha SiAlON($\alpha$-SiAlON) is used herein to describe $\alpha$-Si$_3$N$_4$ structured $\beta'$SiAlON with crystal structure similar to $\alpha$-Si$_3$N$_4$. The formation of alpha SiAlON may be represented by the equations:

(i)
SiO$_2$ + C $\xrightarrow{N_2(G) + \alpha\text{-SiAlON}}$ Si$_3$N$_4$ + CO

(j)
Al$_2$O$_3$ + C $\xrightarrow{N_2(G) + \alpha\text{-SiAlON}}$ AlN + CO and

(k)
Si$_3$N$_4$ + Al$_2$O$_3$ + AlN ⟶ $\alpha$-SiAlON

Heretofore, the carbothermic reaction approach has always produced a SiAlON material that when sintered produced an equiaxed $\beta'$-SiAlON. The alpha phase of the SiAlON was never produced by carbothermic reaction of discrete particles of an SiO$_2$ source and discrete particles of an Al$_2$O$_3$ source.

The following examples are offered to illustrate the production of unsintered $\beta'$SiAlON having the microstructure of $\alpha$-Si$_3$N$_4$ and nonequiaxed $\beta'$SiAlON by the process of this invention.

EXAMPLE 1

$\beta'$-SiAlON with z=0.5 was prepared from a mixture of 156 grams Al$_2$O$_3$ (5.2%), 2019 grams silica (67.4%) and 825 grams carbon(27.5%). This mixture was blended with 450.0 grams of 1 micron $\beta'$-SiAlON seed crystals(15 wt. % addition to the mixture on a dry basis). The final blend had a final composition of 4.51 wt. % Al$_2$O$_3$, 58.53 wt. % SiO$_2$, 23.91 wt. % carbon and 13.04 wt. % $\beta'$-SiAlON seed. The stoichiometric reaction may be represented by the following equation:

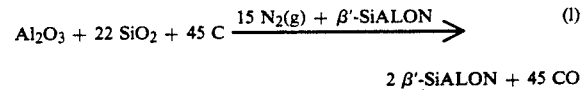
(l)
Al$_2$O$_3$ + 22 SiO$_2$ + 45 C $\xrightarrow{15 N_2(g) + \beta'\text{-SiAlON}}$ 2 $\beta'$-SiAlON + 45 CO The blend was charged into a 1.3 gal ceramic ball mill where the materials were uniformly mixed. The resultant powder was blended with H$_2$O and extruded as pellets. The pellets were dried at 110° C. to drive off the water and was charged into an enclosed reactor vessel provided with an inlet below the pellet bed to permit uniform circulation of gaseous nitrogen through the pellets and an outlet near the top of the vessel to permit discharge of nitrogen and reaction gas products.

The vessel having the pellets therein was enclosed in a heating chamber and nitrogen was charged into the vessel at a pressure sufficient to maintain a flow of nitrogen through the vessel throughout the subsequent heating cycles.

When it was determined that the reaction vessel had been purged of air, temperature within the heating chamber was increased an amount necessary to raise the temperature of the pellets to 1400° C. and that pellet temperature was maintained for 3 hours.

The pellet temperature was then increased to 1500° C. and maintained there for 2 hours. The pellets were then cooled to room temperature and analyzed for composition. It was determined by x-ray diffraction that the processed material comprised: $\beta'$-SiAlON as a major phase, possible trace of SiC and possible trace Fe. Chemical analysis was as follows: 51.7 wt. % Si; 5.52 wt. % Al; O (NA); N (NA); and 0.2 wt. % Fe impurities. Note iron levels of 1–2% are typical when $Fe_2O_3$ has been added as a catalyst.

The material was ground and pressed into billets and sintered at temperatures between 1650°–1750° C., then machined into type "B" bars. The bars were then tested in accordance with Military Standard 1942. The strength of the bars was tested at room temperature and average strength was found to be 77.3 ksi with a range of strengths from 71.4 to 87.5 ksi.

Figure 3:
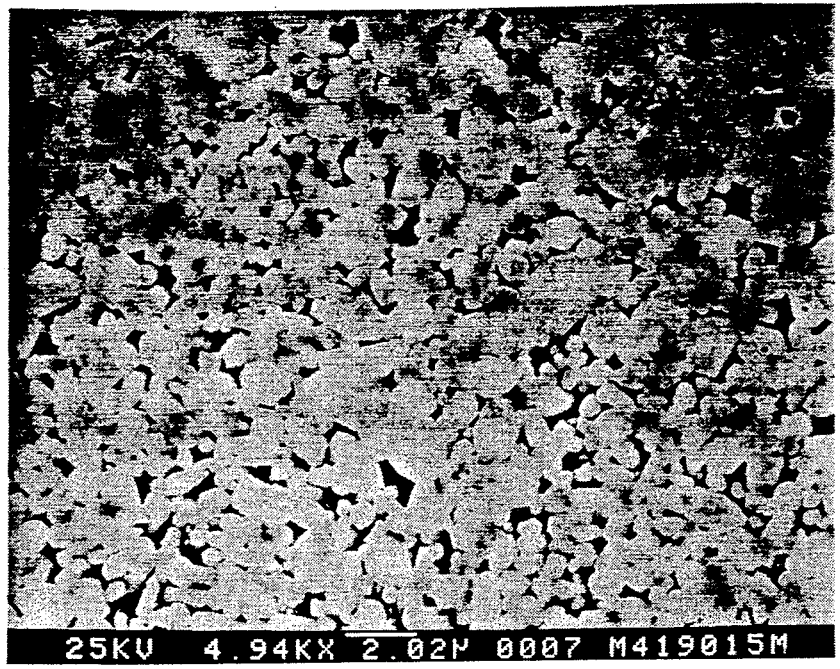
FIG. 3 is a photomicrograph of prior art equiaxed $\beta'$-SiAlON at 4,940 times magnification.

FIG. 3 is a photomicrograph of the material of Example 1 (prior art) equiaxed $\beta'$-SiAlON that has been sintered and etched. The photomicrograph is at at 4,940 times magnification.

In addition, the material was sintered into bars having the following dimensions: 1.875 inches×0.25 inches×0.125 inches. The strength of the bars was tested by 4 point bending at room temperature, 1093° C., 1204° C. and 1260° C. The strengths are are recorded on Table 1 below.

TABLE 1

| Temp. °C. | Strength (ksi) | |
|---|---|---|
| | Average | Range |
| 25 | 57.6 | 46.4–65.7 |
| 1093 | 50.4 | 49.2–53.3 |
| 1204 | 39.2 | 35.1–44.1 |
| 1260 | 28.8 | 25.1–33.7 |

EXAMPLE 2

Example 1 was repeated except that no SiAlON crystals were added to the mixture before firing. In addition, no iron catalyst was added. It was determined by x-ray diffraction that the processed material was comprised of $\beta'$-SiAlON as a major phase, $Si_2ON_2$ as a major phase and SiC as a minor phase. Chemical analysis was as follows: 50.9 wt. % Si; 5.45 wt. % Al and 0.1 wt. % Fe impurities.

The x-ray results of Example 2 reveal that the nitriding reaction was not completed at 1400° C. as evidenced by the oxynitride and relative large quantity of silicon carbide.

EXAMPLE 3

Example 1 was repeated except that alpha $Si_3N_4$ crystals instead of $\beta'$-SiAlON crystals were added to the mixture before firing. Yttrium was added to the mix as a sintering aid.

It was determined by x-ray diffraction that the processed $\beta'$SiAlON material comprised $\alpha$-SiAlON with crystal structure similar to $\alpha$-$Si_3N_4$ as a major phase, possible trace of SiC and possible trace Fe. The material was sintered into military type "B" bars and tested in accordance with Military Standard 1942. The strength of the bars was tested at room temperature and average strength was found to be 79.5 ksi with a range of strengths from 72.3 to 90.5 ksi.

Figure 4:
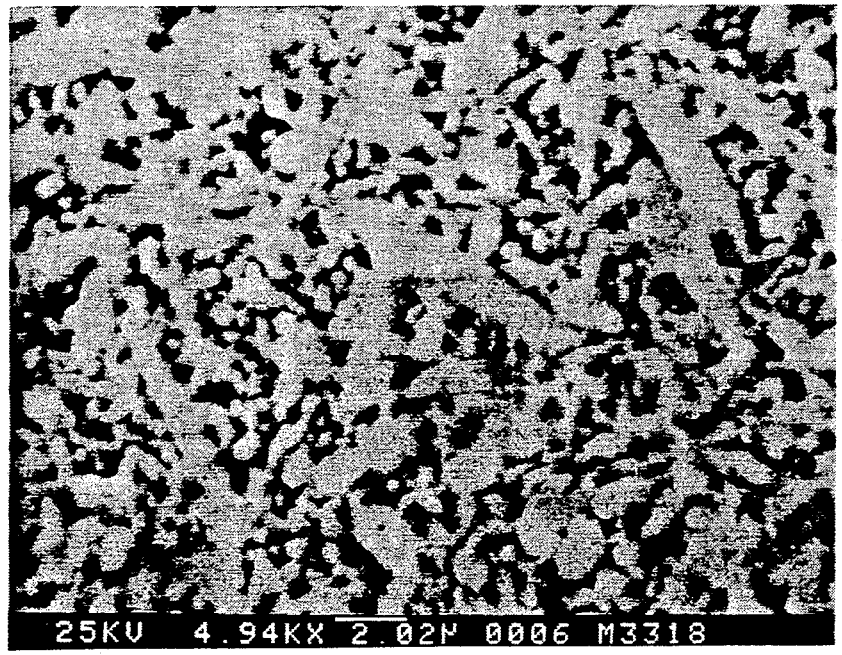
FIG. 4 is a photomicrograph of $\beta'$-SiAlON containing acicular crystals 4,940 times magnification.

FIG. 4 is a photomicrograph of material of Example 3 that has been sintered and etched. The photomicrograph is at 4,940 times magnification. Surprisingly, the sintered material contained acicular $\beta'$-SiAlON crystals throughout. Heretofore, SEM's of $\beta'$SiAlONs were always revealed an equiaxed material. The x-ray pattern of the sintered material was found to be similar to $\beta'$-$Si_3N_4$.

In addition, the material was sintered into bars having the following dimensions: 1.875 inches×0.25 inches×0.125 inches. The strength of the bars was tested by 4 point bending at room temperature, 1093° C., 1204° C. and 1260° C. The strengths are are recorded on the following Table 2.

TABLE 2

| Temp. °C. | Strength (ksi) | |
|---|---|---|
| | Average | Range |
| 25 | 68.1 | 59.6–72.6 |
| 1093 | 61.3 | 51.3–68.5 |
| 1204 | 65.4 | 61.1–72.9 |
| 1260 | 59.8 | 53.3–64.8 |

It is contemplated that different forms of $SiO_2$ and $Al_2O_3$ may be used in practicing the process of the present invention. Thus for example, some forms of $SiO_2$ which can be used as the initial reactant are quartz, cristabolite, tridymite and amorphous silica. Some suitable forms of $Al_2O_3$ which can be used as the initial reactant are $\alpha$-$Al_2O_3$, $\alpha$-$Al_2O_3$, $\kappa$-$Al_2O_3$ and other phases of $Al_2O_3$, oxides and hydroxides of aluminum, aluminum carbonate, aluminum nitrate and gibbsite. One skilled in the art will appreciate that the choice of $SiO_2$ and $Al_2O_3$ which is actually used will be made on cost considerations and that many other forms of $SiO_2$ and $Al_2O_3$ than those specifically listed can be used. In a preferred form of the present invention the preferred median particle size of the $Al_2O_3$ initial reactant is less than 3.5 microns.

It is also contemplated that different weight percents of seed material may be used in practicing the present invention. Thus for example, other than 15 wt. % of on a dry basis seed material may be used. A preferred range for the weight percent of seed material is 4 to 25%. One skilled in the art will appreciate that the higher the weight percent of seed material that is actually used the faster will be the rate of reaction. Although weight percents as high as 50% may be used, the upper limit of the actual percent of seed material is not critical to practicing the invention. The real upper limit to the percentage of seed material which is actually used will be determined by cost considerations. At the lower limit of seed material used in practicing the present invention, the rate of reaction will be greatly reduced when the percentage of material is below 1%.

It is further contemplated that seed crystals used to produce the $\beta'$SiAlON material of the present invention can be can also be made using $\alpha$-$Si_3N_4$ as the seed material. Once the unsintered $\beta'$SiAlON powder having the crystal structure of $\alpha$-$Si_3N_4$ is made in accordance with the present invention, part of the $\beta'$SiAlON material produced can be used as seed material of future $\beta'$SiAlON material. Thus, after the initial $\beta'$SiAlON having the microstructure of $\alpha$-Si$_3$N$_4$ has been produced there is no need to purchase additional $\beta'$SiAlON or $\alpha$-Si$_3$N$_4$ for use as seeding material.

It is further contemplated that the unsintered $\beta'$SiAlON material made in accordance with the present invention can be readily ground to any desired degree of fineness to make a highly reactive grain or powder for subsequent processing. The unsintered $\beta'$SiAlON powder can then be molded into a desired shape and sintered to produce a high density, high strength part such as a component of an internal combustion engine or a high temperature gas turbine. In another application, the unsintered SiAlON powder might be combined with a suitable carrier, applied as a layer to a substrate and affixed thereto by heating to a temperature sufficient to fuse or bond the SiAlON to the substrate. Those skilled in the art will recognize that the particulate $\beta'$SiAlON of the present invention is easier to grind or mill to a desired grain or powder than sintered $\beta'$SiAlON. To the extent that sintered $\beta'$SiAlON could be ground, the resultant powder would not be desirable for use in resintering to make a shape or part. It would have a limited sintering capability, and to the extent it could be resintered, the resintered product would be substantially inferior to a product made from the unsintered $\beta'$SiAlON material of the present invention.

It is further contemplated that the unsintered $\beta'$SiAlON material having the microstructure of $\alpha$-Si$_3$N$_4$ may also be made by other than carbothermic reaction. Thus for example, the seeding method disclosed in the present application may be used in conjunction with the method disclosed in U.S. Pat. No. 4,172,108. The use of the present invention in this process would include that seed material be mixed with a silicon nitride precusor having at least one silicon-nitrogen bond and which is at least one substituted amino or imino silane and an alumina precursor having a least one aluminum-oxygen bond, is at least one member selected from the group consisting of trailkoxyaluminums, tiracyloxyaluminums and polyaluminoxanes in an organic solvent, removing the organic solvent by evaporation to provide a SiAlON precursor composition, and effecting conversion of the SiALON precursor composition into SiALON by heating the SiALON precursor composition at a temperature of not lower than 1000° C. at a rate of elevating the temperature of at most 400° C. per hour either in an atmosphere of an ammonia or inert gas under reduced pressures.

It is further contemplated that the unsintered $\beta'$SiAlON material having the microstructure of $\alpha$-Si$_3$N$_4$ may also be made according to the method disclosed in U.S. Pat. No. 4,438,051. The use of the present invention in this process would include a translucent $\beta'$SiAlON sintered product produced by (1) mixing fine powders of (a) silicon nitride, and aluminum nitride having a high purity of at least 99% and a particle size of at most 200 microns, (b) fine powders of aluminum oxide and silicon oxide having a high purity of at least 99% in such a proportion as to form $\beta'$SiAlON of the formula Si$_{6-z}$Al$_z$O$_z$N$_{8-z}$ where z is from 1 to 4.2, and (c) crystals selected from the group of $\alpha$-Si$_3$N$_4$ and unsintered $\beta'$-SiALON having the microstructure of $\alpha$-Si$_3$N$_4$; and (2) hot pressing the mixture in a nitrogen atmosphere at a temperature of from 1500° to 1850° C. under pressure to form 10 to 1500 kg/cm$^2$.

It is further contemplated that the unsintered $\beta'$SiAlON material having the microstructure of $\alpha$-Si$_3$N$_4$ may also be made according to the method disclosed in U.S. Pat. No. 4,685,607. The use of the present invention in this process would include a nitride ceramic-metal complex material produced by (a) bringing a metallic material selected from the group consisting of: (i) a metal rich in reactivity with a precursor to nitride (ii) an alloy of said metal into contact with the surface of a nitride ceramic material; and (iii) crystals selected from the group of $\alpha$-Si$_3$N$_4$ and unsintered $\beta'$-SiALON having the microstructure of $\alpha$-Si$_3$N$_4$; and (b) heating under vacuum the nitride ceramic material which is kept in contact with the metallic material so as to dissociate the surface of the nitride ceramic material into nitrogen and a precursor to nitride, thereby alloying the dissociated precursor to nitride to react with the metal or alloy thereof so as to achieve bonding between the nitride ceramic material and the metallic material.

It is further contemplated that the unsintered $\beta'$SiAlON material having the microstructure of $\alpha$-Si$_3$N$_4$ may also be made according to the method disclosed in U.S. Pat. No. 4,731,236. The use of the present invention in this process would include a SiAlON powder, which is produced by a process comprising the steps of: (1.) introducing (a) a decomposable silicon compound, (b) decomposable aluminum compound, (c) a decomposable carbon compound and (d) seed crystals selected from the group of $\alpha$-Si$_3$N$_4$ and unsintered $\beta'$-SiALON having the microstructure of $\alpha$-Si$_3$N$_4$, into a steam-containing hot gas to decompose the decomposable silicon compound, aluminum compound and carbon compound in the hot gas into silicon oxide, aluminum oxide and elemental carbon, respectively, thereby producing a fine solid particle mixture consisting essentially of silicon oxide, aluminum oxide, elemental carbon and seed crystals dispersed in gas; and (2.) collecting the fine solid particle mixture dispersed in the gas from the gas phase by a solid-gas separating technique to obtain a carbon-containing composition consisting essentially of silicon oxide, aluminum oxide and elemental carbon, and calcining the composition in a nitrogen-containing gas atmosphere.

It is further contemplated that the unsintered $\beta'$SiAlON material having the microstructure of $\alpha$-Si$_3$N$_4$ made in accordance with the present invention can be readily ground to any desired degree of fineness to make a highly reactive grain or powder for subsequent processing.

While the invention has been described in terms of preferred embodiments, it is intended that all matter contained in the above description or shown in the accompanying drawings shall be interpreted as being illustrative. The present invention is indicated by the broad general meaning of the terms in which the appended claims are expressed.

What is claimed is:

1. A $\beta'$SiAlON having a strength greater than about 50 ksi at approximately 1200° C.

2. The $\beta'$SiAlON of claim 1 which is produced from initial reactant materials comprising Al$_2$O$_3$, SiO$_2$ and carbon.

3. Nonequiaxed sintered $\beta'$SiAlON.

4. Unsintered $\beta'$SiAlON having the crystal structure of alpha silicon nitride.

5. The $\beta'$SiAlON of claim 4 which is produced by carbothermic reaction from initial reactant materials comprising Al$_2$O$_3$, SiO$_2$, carbon and crystal seeds selected from the group of $\alpha$-Si$_3$N$_4$ and unsintered $\beta'$-SiALON having the crystal structure of $\alpha$-Si$_3$N$_4$.

6. The β'SiAlON of claim 4 which is produced by a process which comprises the steps of:
   (a) providing a mixture of initial reactant materials as sources of $SiO_2$, $Al_2O_3$ and C in a reactor;
   (b) adding into said mixture crystals selected from the group of $\alpha$-$Si_3N_4$ and unsintered β'-SiAlON having the crystal structure of $\alpha$-$Si_3N_4$; then
   (c) nitriding said mixture at temperatures between 1200° C. and 1450° C. for a time sufficient to convert a least a portion of said initial reactants to at least a portion of effective reactants; and
   (d) heating said effective reactants in the presence of nitrogen at temperatures from 1400° to 1530° C. for a time sufficient to convert said effective reactants to an essentially β-SiAlON refractory material with a crystal structure of $\alpha$-$Si_3N_4$.

7. A nonequiaxed β'SiAlON produced by:
   nitriding a blend of sources of $SiO_2$, $Al_2O_3$, C and crystals selected from the group of β-SiAlON with crystal structure similar to $\alpha$-$Si_3N_4$ and $\alpha$-$Si_3N_4$ at temperatures of up to approximately 1450° C. to convert at least a portion of said blend to provide a mixture containing $Si_3N_4$, and AlN;
   heating said mixture to a temperature above said nitriding temperature in the presence of nitrogen to convert said mixture to a β'SiAlON material having a crystal structure of $\alpha$-$Si_3N_4$; and
   sintering said β'SiAlON material having a crystal structure of $\alpha$-$Si_3N_4$ to produce a nonequiaxed β'SiAlON.

8. The β'SiAlON claim 7 wherein said SiAlON crystals are $\alpha$-SiAlON and said step of nitriding said mixture is performed at temperatures between 1200° C. and 1450° C. for less than 5 hours.

9. β'SiAlON of claim 7 wherein the preferred median particle size of said crystals is less than or equal to approximately 1 micron.

10. Nonequiaxed β'SiAlON which is substantially free of contaminating transition metal oxides, said SiAlON being produced from a mixture of sources of $SiO_2$, $Al_2O_3$, C and crystals selected from the group of $\alpha Si_3N_4$ and β-SiAlON with crystal structure of $\alpha$-$Si_3N_4$.

11. The SiAlON of claim 10 wherein said SiAlON crystals contain acicular β'-SiAlON crystals and said SiAlON produced is acicular β'-SiAlON.

12. A process for producing a translucent (,SiAlON sintered product which comprises:
   mixing fine powders of (a) silicon nitride, and aluminum nitride having a high purity of at least 99% and a particle size of at most 200 microns, (b) fine powders of aluminum oxide and silicon oxide having a high purity of at least 99% in such a proportion as to form β'SiAlON of the formula $Si_{6-z}Al_zO_zN_{8-z}$ where z is from 1 to 4.2, and (c) crystals selected from the group of $\alpha$-$Si_3N_4$ and unsintered β'-SiAlON having the microstructure of $\alpha$-$Si_3N_4$; and
   hot pressing the mixture in a nitrogen atmosphere at a temperature of from 1500° to 1850° C. under pressure to from 10 to 1500 kg/cm².

13. A process for producing SiAlON powder, which process comprises the steps of:
   introducing (a) a decomposable silicon compound, (b) decomposable aluminum compound, (c) a decomposable carbon compound and (d) seed crystals selected from the group of $\alpha$-$Si_3N_4$ and unsintered β'-SiAlON having the microstructure of $\alpha$-$Si_3N_4$, into a steam-containing hot gas to decompose said decomposable silicon compound, aluminum compound and carbon compound in said hot gas into silicon oxide, aluminum oxide and elemental carbon, respectively, thereby producing a fine solid particle mixture consisting essentially of said silicon oxide, aluminum oxide, elemental carbon and seed crystals dispersed in said gas; and
   collecting said fine solid particle mixture dispersed in said gas from the gas phase by a solid-gas separating technique to obtain a carbon-containing composition consisting essentially of said silicon oxide, aluminum oxide and elemental carbon, and calcining said composition in a nitrogen-containing gas atmosphere.

14. A process for producing SiALON, which comprises:
   mixing (a) a silicon nitride precursor having at least one silicon-nitrogen bond and which is at least one substituted or unsubstituted amino or imino silane (b) an alumina precursor having at least one aluminum-oxygen bond, is at least one member selected from the group consisting of trialkoxyaluminums, triacyloxyaluminums and polyaluminoxanes in an organic solvent, and (c) seed crystals selected from the group of $\alpha$-$Si_3N_4$ and unsintered β'-SiALON having the microstructure of $\alpha$-$Si_3N_4$,
   removing the organic solvent by evaporation to provide a SiALON precursor composition, and
   effecting conversion of the SiALON precursor composition into SiALON by heating the SiALON precursor composition at a temperature of not lower than 1000° C. at a rate of elevating the temperature of at most 400° C. per hour either in an atmosphere of an ammonia or inert gas under reduced pressures.

* * * * *

UNITED STATES PATENT AND TRADEMARK OFFICE
CERTIFICATE OF CORRECTION

PATENT NO. : 5,108,967

DATED : April 28, 1992

INVENTOR(S) : Frankie E. Phelps, Gerald W. Leech and Robert W. Woods

It is certified that error appears in the above-identified patent and that said Letters Patent is hereby corrected as shown below:

Title Page:

Abstract, line 3     After "$Al_2O_3$", insert --$SiO_2$--.

Col. 5, line 8     Change "$\alpha-Si_3N_4$" (second occurrence) to --$\beta-Si_3N_4$--.

Col. 8, line 8     Change "$\alpha-Si_3N_4$" to --$\beta-Si_3N_4$--.

Col. 10, line 34     Change "$\alpha-Al_2O_3$" to --$\beta-Al_2O_3$--.

Signed and Sealed this

Seventh Day of September, 1993

Attest:

BRUCE LEHMAN

*Attesting Officer*     *Commissioner of Patents and Trademarks*